US009892723B2

(12) United States Patent
Korbecki

(10) Patent No.: US 9,892,723 B2
(45) Date of Patent: Feb. 13, 2018

(54) SYSTEMS AND METHODS FOR PRESENTING SOCIAL NETWORK COMMUNICATIONS IN AUDIBLE FORM BASED ON USER ENGAGEMENT WITH A USER DEVICE

(71) Applicant: United Video Properties, Inc., Santa Clara, CA (US)

(72) Inventor: William Korbecki, Crystal Lake, IL (US)

(73) Assignee: Rovi Guides, Inc., San Jose, CA (US)

( * ) Notice: Subject to any disclaimer, the term of this patent is extended or adjusted under 35 U.S.C. 154(b) by 121 days.

(21) Appl. No.: 14/088,706

(22) Filed: Nov. 25, 2013

(65) Prior Publication Data

US 2015/0149179 A1 May 28, 2015

(51) Int. Cl.

| | |
|---|---|
| ***G10L 13/00*** | (2006.01) |
| ***G10L 13/08*** | (2013.01) |
| ***G10L 15/00*** | (2013.01) |
| ***G10L 25/00*** | (2013.01) |

(52) U.S. Cl.

CPC .............. *G10L 13/00* (2013.01); *G10L 13/08* (2013.01)

(58) Field of Classification Search

None

See application file for complete search history.

(56) References Cited

U.S. PATENT DOCUMENTS

| | | | | |
|---|---|---|---|---|
| 7,650,170 | B2 * | 1/2010 | May | H04M 1/6066 379/420.04 |
| 7,761,892 | B2 | 7/2010 | Ellis et al. | |
| 7,783,980 | B1 * | 8/2010 | Herold | G06Q 10/107 715/740 |
| 8,046,801 | B2 | 10/2011 | Ellis et al. | |
| 8,522,310 | B1 * | 8/2013 | Buckwalter | G06F 21/31 726/2 |
| 8,972,495 | B1 * | 3/2015 | Borna | H04L 51/08 709/204 |
| 9,014,546 | B2 | 4/2015 | Shimy et al. | |
| 2005/0020250 | A1 * | 1/2005 | Chaddha | H04L 51/24 455/414.1 |
| 2006/0093998 | A1 * | 5/2006 | Vertegaal | G06F 3/011 434/236 |
| 2006/0293874 | A1 * | 12/2006 | Zhang | G06F 17/289 704/2 |

(Continued)

*Primary Examiner* — Richemond Dorvil
*Assistant Examiner* — Thuykhanh Le
(74) *Attorney, Agent, or Firm* — Haley Guiliano LLP

(57) ABSTRACT

Methods and systems are described herein for generating an audible presentation of a communication received from a remote server. A presentation of a media asset on a user equipment device is generated for a first user. A textual-based communication is received, at the user equipment device from the remote server. The textual-based communication is transmitted to the remote server by a second user and the remote server transmits the textual-based communication to the user equipment device responsive to determining that the second user is on a list of users associated with the first user. An engagement level of the first user with the user equipment device is determined. Responsive to determining that the engagement level does not exceed a threshold value, a presentation of the textual-based communication is generated in audible form.

18 Claims, 8 Drawing Sheets

(56) References Cited

U.S. PATENT DOCUMENTS

2010/0179991 A1* 7/2010 Lorch ................. H04M 1/7253 709/206
2010/0205667 A1* 8/2010 Anderson ............... G06F 3/013 726/19
2012/0166431 A1* 6/2012 Brewington ........ G06F 17/3087 707/724
2012/0268294 A1* 10/2012 Michaelis ............. G06F 9/4443 340/905
2013/0166915 A1* 6/2013 Desai .................... H04L 9/3247 713/176
2013/0170813 A1* 7/2013 Woods ................... H04N 5/765 386/200
2014/0108842 A1* 4/2014 Frank ...................... G06F 17/28 713/323
2014/0150002 A1* 5/2014 Hough ............... H04N 21/4415 725/9
2014/0176813 A1* 6/2014 Conness .................. H04N 5/60 348/738
2014/0215086 A1* 7/2014 Pitschel .............. H04L 65/1089 709/231
2014/0236586 A1* 8/2014 Singh ....................... G10H 1/18 704/211
2014/0310351 A1* 10/2014 Danielson ............. H04L 65/403 709/204
2015/0100356 A1* 4/2015 Bessler et al. ............... 705/7.12
2015/0100528 A1* 4/2015 Danson .................... G06N 5/04 706/21
2015/0112796 A1* 4/2015 Greenzeiger ...... G06Q 30/0251 705/14.49
2015/0120293 A1* 4/2015 Wohlert .................. G10L 21/02 704/235
2015/0127340 A1* 5/2015 Epshteyn ................ G10L 15/26 704/235
2015/0134389 A1* 5/2015 Punera ........... G06Q 10/063114 705/7.15

* cited by examiner

100

200

600

SYSTEMS AND METHODS FOR PRESENTING SOCIAL NETWORK COMMUNICATIONS IN AUDIBLE FORM BASED ON USER ENGAGEMENT WITH A USER DEVICE

BACKGROUND

Traditional systems present social network communications (e.g., status updates) upon receipt of the messages on televisions or other media equipment. However, while users are engaged in another activity but still have the television turned ON in the background, they often miss the social network communications that are received with the television. This is due to the fact that the communications are typically textual and the users are not watching the television when the communications are presented.

SUMMARY OF THE DISCLOSURE

Accordingly, methods and systems are described herein for presenting social network communications in audible form based on user engagement with a user device. In particular, the social network communication is converted into audible form for presentation to the user when an attentiveness level of the user relative to the user device does not exceed a threshold value.

In some embodiments, a presentation of a media asset is provided to a first user on a user equipment device. The user equipment device may receive a textual-based communication from a remote server. For example, the user equipment device may receive a status update of another user in the first user's list of friends or users on a social network. The textual-based communication may be transmitted to the remote server by a second user and the remote server transmits the textual-based communication to the user equipment device responsive to determining that the second user is on a list of users associated with the first user. An engagement level of the first user with the user equipment device may be determined. Responsive to determining that the engagement level does not exceed a threshold value, a presentation of the textual-based communication may be presented in audible form. In some implementations, the audible form of the textual-based communication may be based on a voice signature of the second user. Specifically, the communication may be presented to the user audibly in the voice of the user who sent the communication.

In some implementations, presentation of the textual-based communication in audible form is performed instead of generating a visual presentation of the communication. In some implementations, audio from the generation of the presentation of the textual-based communication in audible form replaces audio corresponding to the media asset.

In some implementations, the first user may assign priorities to each user or group of users in the list of users. For example, the user may assign a high priority value to family members on the list of users and a lower priority value to colleagues on the list of users. In some embodiments, upon receiving the communication, a priority level associated with the second user may be determined. In response to determining the priority level exceeds a priority threshold assigned by the first user, an audible signal unique to the second user may be generated for presentation to the first user. The audible signal identifies the second user to the first user when heard by the first user. In some implementations, the audible signal may be unique to a group of users (e.g., family members) (e.g., a unique tone or sound) and identifies the group of users when heard by the first user. The audible signal is sounded before the textual-based communication is presented in audible form.

In some embodiments, content of the communication is processed to determine whether the communication is urgent. In particular, the communication may relate to a fantasy sporting event competitor or news event or the like that the first user may be interested in. In such circumstances, an audible signal unique to the urgency of the communication may be generated for presentation to the first user. When heard by the first user, the audible signal identifies the communication as urgent and as being related to the fantasy sporting event competitor and/or news event or the like. The audible signal is sounded before the textual-based communication is presented in audible form.

In some embodiments, text from the textual-based communication is processed using a text-to-speech technique to convert the text into the audible form. The audio from the audible form is presented to the user on the user equipment device or on one or more mobile devices associated with the first user.

In some embodiments, the engagement level may be determined by analyzing whether a gaze of the first user is directed at a display associated with the user equipment device for a threshold period of time. In some embodiments, the engagement level may be determined by determining whether the first user is within a given proximity of the user equipment device (e.g., for a threshold period of time).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
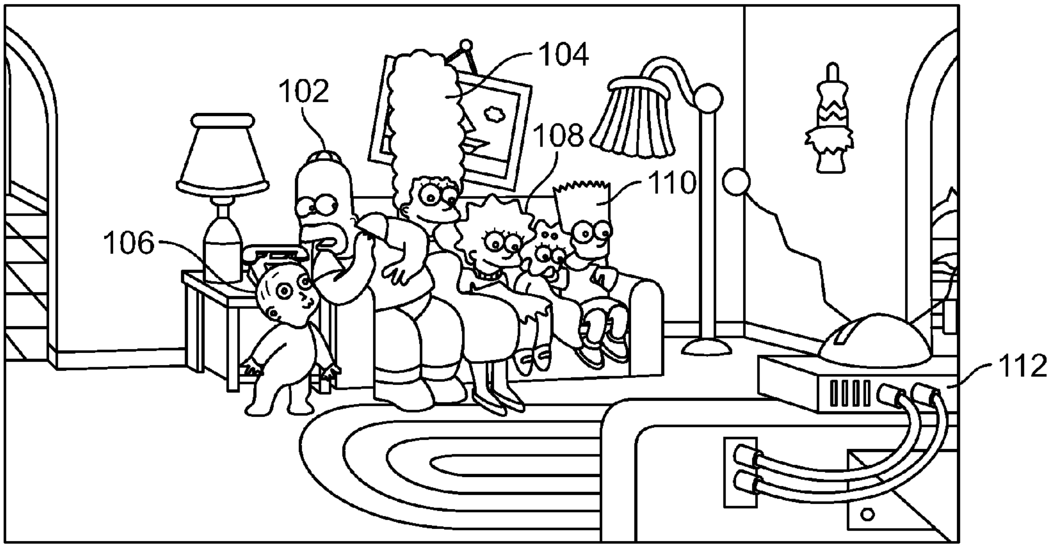
FIG. 1 shows an illustrative example of a viewing area from which a media application may determine an attentiveness level associated with each user in accordance with some embodiments of the disclosure.

Methods and systems are described herein for a media application capable of receiving a textual-based social network communication from a remote server, determining an engagement or attentiveness level of the user with the user device, and, in response to determining that the engagement or attentiveness level is below a threshold level, presenting the textual-based social network communication in audible form.

Media applications may take various forms depending on their function. Some media applications generate graphical user interface screens (e.g., that enable a user to navigate among, locate and select content), and some media applications may operate without generating graphical user interface screens (e.g., while still issuing instructions related to the transmission of media assets and advertisements).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices which they traditionally did not use. As referred to herein, the phrase "display device," "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media applications may be provided as on-line applications (i.e., provided on a web-site), or as stand-alone applications or clients on user equipment devices. Various devices and platforms that may implement media applications are described in more detail below.

As used herein, an "attentiveness level" or "engagement level" are used interchangeably and should be understood to mean a quantitative or qualitative analysis of the level of attention that a user is giving a media asset presented on a given user equipment device. For example, an attentiveness level may represent a numerical amount or score computed based on one or more types of data describing the user or users currently within a viewing area of a user device with which the media application is associated. In some embodiments, the attentiveness level may be normalized (e.g., in order to represent a number between one and one-hundred). In some embodiments, the attentiveness level may be described as a percentage (e.g., of a user's total amount of attention). In some embodiments, the attentiveness level may be described as a positive (e.g., "attentive") or negative (e.g., "non-attentive") designation. The words "engagement," "engaged," "attentiveness," and "attention" may be used interchangeably throughout and should be understood to have the same meaning. In some embodiments, the attentiveness level of a user may be computed before, during, or after a communication or message is received.

The media application may compute an attentiveness level of a user with respect to a user equipment device before or after a social network communication (e.g., a textual-based communication) is received, in order to determine whether or not to present the communication in audible form. For example, in some embodiments, when the attentiveness level of the user is below a predetermined or dynamic threshold, the media application may convert text in the communication to audible form using a text-to-speech technique. In some implementations, the conversion to the audible form may take into account a voice of the second user (e.g., the user who sent the communication), such that when sounded the audio of the communication is presented in the voice of the second user. The media application may then present the communication in the audible form for the user. In some embodiments, the audio from the converted communication may be provided concurrently with a media asset being presented on the user equipment device. In some embodiments, the audio from the converted communication may replace audio of a media asset being presented on the user equipment device. In some embodiments, the audio from the converted communication may be presented on a mobile device associated with a user while a media asset continues to be presented on the user equipment device.

In some embodiments, the media application may determine a priority level associated with the received social network communication. In some implementations, the priority level may be specified by the remote server from which the communication is received. In some implementations, the priority level may be determined automatically by the media application based on a database that defines different priority levels for different users that are associated with the user who is receiving the communication. In response to determining that the priority level exceeds a threshold (user defined or predetermined), the media application may retrieve a unique audible signal that is associated with the user (e.g., a second user) who generated the communication. The audible signal may uniquely identify the second user to the first user. The audible signal may be the name of the second user, a voice of the second user, or any other audible signal that the first user associates with the second user when the first user hears the audible signal. The media application may present the unique audible signal before or after presenting the social network communication in audible form. Accordingly, even though the user is not engaged with the user equipment, the user is informed about the social network communication (audibly) and is informed about who sent the social network communication (audibly). In some embodiments, when the priority level exceeds the threshold, the media application may process the audio of the converted communication using a voice of the second user. In such circumstances, when the audio of the audible form of the communication is presented, it sounds like the second user is conveying the message.

In some implementations, the priority level may be determined automatically by the media application based on a database (user generated or predetermined) that defines different priority levels for different types of message content in the social network communication. For example, one priority level may be assigned to messages that are not urgent and another higher priority level may be assigned to urgent messages. For example, the user may specify that any message that identifies a particular player or is associated with a user's fantasy sporting event competitor should be processed as urgent and all other messages should not. In response to determining that the priority level exceeds a threshold (user defined or predetermined), the media application may retrieve a unique audible signal that is associated with the level of urgency (e.g., one unique audible signal may be associated with urgent messages and another may be associated with non-urgent messages). The audible signal may uniquely identify the message as urgent or non-urgent to the first user. The media application may present the unique audible signal before or after presenting the social network communication in audible form. Accordingly, even though the user is not engaged with the user equipment, the user is informed about the social network communication (audibly) and is informed about the urgency of the social network communication (audibly).

In some implementations, a communication may be determined to have a high priority because of the priority level associated with the sender of the communication and because of the message in the communication. In such circumstances, an audible signal may be generated and sounded to the user before or after presenting the social network communication in audible form. The audible signal may be unique such that when heard by the first user, the first user is informed that the communication was sent by a user with a high priority and the contents of the communication are urgent. In some implementations, two audible signals may be generated and sounded to the user before or after presenting the social network communication in audible form. The first audible signal may inform the user that the message in the communication is urgent and the second audible signal may identify the sender of the communication to the first user.

As referred to herein, the phrase "social network communication" should be understood to mean any communication received by a given user from another user over a social network. The other user from whom the communication is received may be a friend of the user on the social network. For example, the communication may be a status update that is broadcast by one user to all of the user's friends on the social network, a directed message on the social network, or the like. Social network should be understood to mean a site hosted by a remote server (e.g., over the Internet) where different users can form groups (e.g., lists of friends) and communicate with each other in those groups.

In some embodiments, the attentiveness level may be based on receiving one or more types of data. For example, the attentiveness level may be determined based on data indicating whether or not the user is viewing a display device upon which a media asset is accessed and where the social network communication is to be presented; data indicating whether the user is listening to the user device where the social network communication is to be presented; data indicating whether the user is interacting with the user device where the social network communication is to be presented; data indicating whether the user is interacting with another device (e.g., a second screen device) where the social network communication is not to be presented; data indicating whether the user is interacting with another user (e.g., having a conversation with another user), or any other information that may be used by the media application to influence the attentiveness level that the media application associates with one or more users. In some implementations, the data may be received from another device associated with the user. For example, a first device on which the social network communication is to be presented may receive data indicating whether the user is interacting with a second device (e.g., a second screen device) where the social network communication is not to be presented which may include an indication that the second device is in use and may include an identifier of the user who is using the device.

In some embodiments, the media application may determine whether a second device is in use based on visual cues associated with use of the second device instead of (or in addition to) receiving data from the second device. For example, in a dimly lit room (or in a room where a luminance value does not exceed a threshold), a user's face may be brighter than another object in the room (e.g., another user's face or a couch) due to reflections of light emitted by the second device off a user's body/face. In such circumstances, the media application may determine that the brightness or amount of light being reflected off the user's face exceeds a given threshold. In response to this determination, the media application may reduce an attentiveness level of the user as the media application may set a value indicating that the second user is using a second device. In some implementations, the media application may determine the relative brightness of one region of the user's face or body to another region of the user's face to determine how the second device is being used. For example, in response to determining that the right portion (or ear) of the user's face is brighter than the left portion, the media application may determine that the user is using the second device to make a phone call. In such circumstances, the media application may reduce the attentiveness level of the user but also may avoid presenting social network communications in audible form for the user so as to not disturb the phone conversation the user is engaged in. Alternatively, in response to determining that the face and upper torso of the user are lit more brightly than the remaining parts of the user's body, the media application may determine that the user is using a computer or laptop as the second device. In such circumstances, the media application may reduce the attentiveness level of the user and may send any social network communications to the computer or laptop for visual presentation instead of (or in addition) to presenting the social network communication audibly and/or visually on the first device.

In some embodiments, the attentiveness level may be based on an impairment (visual or audible) of the user. For example, a user who is visually impaired (e.g., because of a physical or geographical impairment such as being too far from a display) may be facing a display and thereby may be determined to be attentive but may not be able to see content on the display. In such circumstances, the media application may lower a level of attentiveness associated with the user because of the impairment even though the user appears to be attentive (e.g., is facing the display). Accordingly, a social network communication that is received for a user who appears to be attentive (e.g., would otherwise have an attentiveness level that exceeds a threshold) but is associated with an impairment may be presented in audible form and in visual form (or audible form only). This ensures that the user with the impairment is exposed to the social network communication.

In some embodiments, the attentiveness level may be based on a time of day. For example, the media application may lower a level of attentiveness associated with the user in the morning and increase the level of attentiveness in the evening.

For example, the presence, or amount of, any type of data may influence (e.g., increase, decrease, or maintain) an attentiveness level of a user as determined by the media application. For example, if the media application determines the user is making eye contact with the display device where the social network communication is to be displayed, the media application may increase an attentiveness level associated with the user as eye contact indicates that a user is devoting his/her attention to the display device and hence will see the social network communication when it is presented. Likewise, if the media application determines the user is engaged in a conversation with other users or is interacting with a second screen device (e.g., a smartphone), the media application may decrease an attentiveness level associated with the user as being engaged in a conversation indicating the user is distracted from the user device and hence will miss the social network communication being presented on the user device.

In some embodiments, the media application may determine a composite attentiveness level of several users. As used herein, a "composite attentiveness level" is a level of attentiveness of a plurality of users that represents a statistical analysis (e.g., a mean, median, mode, etc.) of the individual attentiveness level of each user in the plurality of users. For example, in some embodiments, a message may be delayed from being presented when a composite attentiveness level instead of an attentiveness level associated with a single user does not exceed a threshold value. It should be noted, therefore, that any embodiment or description relating to, or using, an attentiveness level associated with a single user may also be applied to a composite attentiveness level of several users.

To determine an attentiveness level of a user, in some embodiments, the media application (e.g., in some cases via a detection module incorporated into or accessible by the media application) may use a content recognition module or algorithm to generate data describing the attentiveness of a user. The content recognition module may use object recognition techniques such as edge detection, pattern recognition, including, but not limited to, self-learning systems (e.g., neural networks), optical character recognition, on-line character recognition (including but not limited to dynamic character recognition, real-time character recognition, intelligent character recognition), and/or any other suitable technique or method to determine the attentiveness of a user. For example, the media application may receive data in the form of a video. The video may include a series of frames. For each frame of the video, the media application may use a content recognition module or algorithm to determine the people (including the actions associated with each of the people) in each of the frame or series of frames.

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the attentiveness of a user. For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation). Based on a combination of the data generated by the various detection module components, the media application may compute an attentiveness level for the two people within the viewing area.

In addition, the media application may use multiple types of optical character recognition and/or fuzzy logic, for example, when processing keyword(s) retrieved from data (e.g., textual data, translated audio data, user inputs, etc.) describing the attentiveness of a user (or when cross-referencing various types of data in databases). For example, if the particular data received is textual data, using fuzzy logic, the media application (e.g., via a content recognition module or algorithm incorporated into, or accessible by, the media application) may determine two fields and/or values to be identical even though the substance of the data or value (e.g., two different spellings) is not identical. In some embodiments, the media application may analyze particular received data of a data structure or media asset frame for particular values or text using optical character recognition methods described above in order to determine the attentiveness of a user. The data received could be associated with data describing the attentiveness of the user and/or any other data required for the function of the embodiments described herein. Furthermore, the data could contain values (e.g., the data could be expressed in binary or any other suitable code or programming language).

An attentiveness level threshold value may be predetermined or dynamically updated. As used herein, an "attentiveness level threshold value" refers to an attentiveness level of a user or users that must be met or exceeded in order for a received social network communication to be displayed on a user device. When the attentiveness level of the user or users does not exceed the attentiveness level threshold value, the received social network communication may be presented in audible form (e.g., processed using a text-to-speech technique) and read out for the user instead of, and/or in addition to, being presented in textual or visual form.

In some embodiments, the media application may modify the attentiveness level threshold based on a user profile and/or a current status of the user. For example, a user may adjust the status to that of allowing interruptions from not allowing interruptions. When the status is set to not allowing interruptions, the attentiveness level threshold may be set to an infinite value or very high value in order to always cause social network communications to be presented in audible form when the user is not completely engaged with the user device (e.g., has a very low attentiveness level with the user device). Such a status may be desirable when the user is performing an activity that allows him/her to enjoy a media asset being presented on the user device without having to see the media asset (e.g., cooking). Alternatively, when the status is set to allowing interruptions, the attentiveness level threshold may be set to zero or very low value in order to allow social network communications to be presented even though the user is not completely engaged with the user device (e.g., has a very low attentiveness level with the user device). The attentiveness level threshold may be automatically adjusted by the media application based on a user profile (e.g., a calendar of the user) indicating what the current state or activity is of the user.

As used herein, a “viewing area” refers to a finite distance from a display device typically associated with an area in which a user may be capable of viewing a social network communication on the display device of the user device. In some embodiments, the size of the viewing area may vary depending on the particular display device. For example, a display device with a large screen size may have a greater viewing area than a display device with a small screen size. In some embodiments, the viewing area may correspond to the range of the detection modules associated with the media application. For example, if the detection module can detect a user only within five feet of a display device, the viewing area associated with the display device may be only five feet. Various systems and methods for detecting users within a range of a media device, are discussed in, for example, Shimy et al., U.S. patent application Ser. No. 12/565,486, filed Sep. 23, 2009, which is hereby incorporated by reference herein in its entirety.

In some embodiments, the social network communication may be associated with a priority level. The priority level may be assigned to the social network communication based on a priority level a recipient of the communication assigns to the sender of the communication. For example, a first user (e.g., the recipient of the social network communication) may assign different priority levels to different users in the friends list on the social network. When the remote server of the social network receives a communication from one of the users on the friends list, the remote server may associate a priority level with the received social network communication based on the priority level assigned to that user. Specifically, the first user may be more interested in receiving social network communications from a family member over a colleague. Accordingly, the first user may assign a higher priority level to the family member over the colleague. This may cause a communication received from the family member with a high priority level by the first user to be presented in audible form if the first user is not engaged with the user device. However, a different communication received from the colleague by the first user may be presented only in textual or visual form even though the first user is not engaged with the user device because the colleague has a lower priority level than the family member. Alternatively or in addition, the social network communication may be presented in audible form regardless of the associated priority level, however if the priority level exceeds a given threshold an audible signal may be presented before or after the social network communication is presented in audible form. The audible signal may be unique to the sender of the communication or the message content. For example, the audible signal may identify the sender of the communication by name and/or may identify the communication as urgent or non-urgent.

FIG. 1 shows an illustrative example of a viewing area from which a media application may determine an attentiveness level associated with each user in accordance with some embodiments of the disclosure. Viewing area 100 illustrates a viewing area featuring a plurality of users (e.g., user 102, user 104, user 106, user 108, and user 110) that a media application may analyze to determine whether or not to present a received social network communication in audible form as discussed in relation to FIGS. 7-10 below.

In some embodiments, a media application (e.g., implemented on display device 112) may determine the attentiveness level of each of the plurality of users in viewing area 100. Based on the characteristics and actions (e.g., whether or not the users are distracted from seeing the social network communication on a display device of the user device) of each of the users, the media application determines an attentiveness level for each of the users (e.g., as described below in FIG. 6). In some embodiments, the attentiveness level for each user in viewing area 100 may be combined to generate a composite attentiveness level as described in FIG. 8 below.

In viewing area 100, a plurality of users are currently viewing a media asset displayed on display device 112 (e.g., user equipment device 402, 404, and/or 406 (FIG. 4)). In order to determine whether or not to present a social network communication in audible form, the media application may generate data associated with the attentiveness of each of the users (e.g., user 102, user 104, user 106, user 108, and user 110) via a detection module (e.g., detection module 316 (FIG. 3)) incorporated into, or accessible by, the media application. In some embodiments, the detection module may include multiple components capable of generating data, of various types, indicating the attentiveness level of each user.

For example, a video detection component may detect the number of users and identity (e.g., in order to associate each user with a user profile as discussed above) of each of the users within viewing area 100, an audio detection module may determine user 102 and user 106 are currently engaged in a conversation, and an eye contact detection component (e.g., as described in FIG. 5 below) may determine that each of the users is currently making eye contact with display device 112. Based on this data, the media application may determine an attentiveness level for each of the users (e.g., as discussed below in relation to FIG. 7).

For example, when computing an attentiveness level for each of the users (e.g., as discussed in FIG. 8 below), the media application may increase the determined attentiveness level for each user because each user is currently making eye contact with the display device featuring the media asset. In addition, the media application may decrease the attentiveness level of user 102 and user 106 because they are currently engaged in a conversation.

For example, viewing area 100 may represent a group of users (e.g., user 102, user 104, user 106, user 108, and user 110) viewing an important event (e.g., the National Football League's Superbowl) on a display device (e.g., display device 112). Given the nature of the social network communication, the media application may present the social network communication in visual or textual form if a collective attentiveness level of the users exceeds a threshold. If the collective attentiveness level does not exceed the threshold, the media application may convert text of the social network communication to audible form and present the social network communication in audible form using a shared audio device. In some implementations, the media application may transmit the social network communication to a respective mobile device of each of the users in viewing area 100 for presentation in audio or visual form. For example, if three out of five users in viewing area 100 are not engaged with the user device, responsive to receiving a social network communication, the media application may convert text from the social network communication to audio form and present the social network communication in audio and visual form. This ensures all of the users in viewing area 100 become exposed visually or audibly to the social network communication. That is, users who are engaged with the user device will be exposed visually to the social network communication because the media application may display the social network communication as an overlay or adjacent to the content being presented. Users who are not engaged with the user device will be exposed audibly to the social network communication, for example through a shared audio device or a respective mobile device associated with each of the users. In some implementations, the media application may present a received social network communication visually and audibly if less than a threshold number of users in viewing area 100 are engaged. In some implementations, the media application may present a received social network communication only audibly if less than a threshold number of users in viewing area 100 are engaged.

In some embodiments, viewing area 100 may be part of public space (e.g., a restaurant of bar). Users in viewing area 100 may be divided into groups and each group may be associated with a given audio device (e.g., a speaker or table speaker). The media application may present content (e.g., social network communications) that pertain to a given group using the shared audio device of the group. For example, a social network communication that is received from a user on a list of users associated with a member of one of the groups may be presented audibly or visually only to those users in the group using the shared audio device of the group. In some implementations, the media guidance application may present the social network communication to all the groups visually (e.g., using a shared display device) but may present the social network communication to users in certain groups based on composite attentiveness levels of the groups. Specifically, if the media application determines that certain groups have a composite attentiveness level that does not exceed a given threshold, then the media application may present the social network communication to the audio device of that group only while the remaining groups are exposed to the social network communication on the shared display.

In some embodiments, the media guidance application may present a social network communication audibly and/or visually based on which users are associated with an attentiveness level that exceeds a given threshold. For example, when two users are in viewing area 100, the media guidance application may present audible and/or visually any social network communication that is received that is associated with either of the two users when both are engaged (e.g., are both associated with an attentiveness level that exceeds a threshold). In some implementations, in response to determining that a first of the two users has become disengaged (e.g., an associated attentiveness level no longer exceeds a threshold), the media guidance application may present only social network communications that pertain to or are associated with the second of the two users who is still engaged. The media application may avoid presenting any social network communication associated with the first user. Alternatively, the social network communication may present social network communications associated with the second user (who is still engaged) in visual form only and present social network communications associated with the first user in audible form only. As referred to herein, a social network communications that is associated with a given user is a social network communications that is received from another user who is user (fried) on a list of users (friends) associated with the given user.

In some implementations, the media guidance application may determine priorities associated with received social network communications in determining whether to present the social network communications visually or audibly. For example, when the first of the two users becomes disengaged, instead of precluding presentation of social network communications associated with the first user altogether, the media guidance application may present only social network communications associated with the first user if they exceed a given priority level. Specifically, the media guidance application may continue to present all social network communications associated with the second user while the second user is engaged but present audible and/or visually only those social network communications that are associated with the first user who is disengaged that exceed a given priority level. Namely, the media guidance application may present only those social network communications associated with the first user who are received from users indicated to be family members on a list of users associated with the first user.

It should be noted that the embodiments of this disclosure are not limited to any particular display device (e.g., a television) or any particular location (e.g., a private residence) of a display device. In some embodiments, the methods and systems of this disclosure may be adapted for use with various types of display devices and locations.

Figure 2:
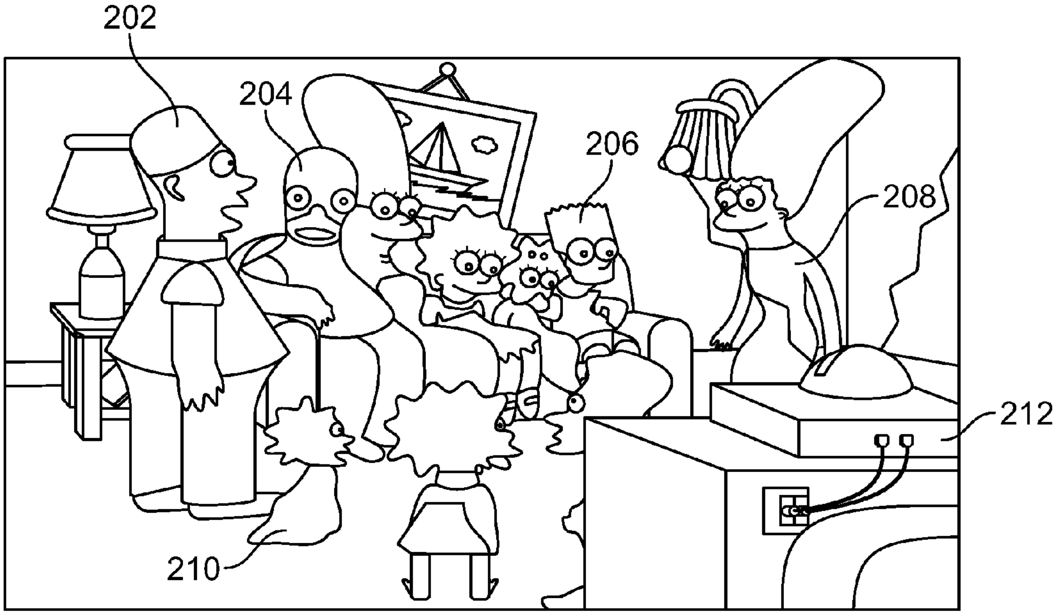
FIG. 2 shows another illustrative example of a viewing area from which the media application may determine an attentiveness level associated with each user in accordance with some embodiments of the disclosure.

FIG. 2 shows another illustrative example of a viewing area from which the media application may determine an attentiveness level associated with each user in accordance with some embodiments of the disclosure. Viewing area 200 illustrates another viewing area featuring another plurality of users (e.g., user 202, user 204, user 206, user 208, and user 210) that a media application may analyze to determine whether or not to present a social network communication in audible form as discussed in relation to FIGS. 7-10 below.

In viewing area 200, not all users are currently viewing a media asset displayed on display device 212 (e.g., user equipment device 402, 404, and/or 406 (FIG. 4)). For example, user 202, user 204, user 206, user 208, and user 210 are not currently looking at display device 212. Therefore, in some embodiments, the media application may compute a lower attentiveness level for each of those users. For example, a detection module (e.g., detection module 316 (FIG. 3)) may determine that user 202, user 204, user 206, user 208, and user 210 are not currently making eye contact with the display device and are thus not viewing the media asset and/or messages. Therefore, when computing an attentiveness level for each of the users (e.g., as discussed in FIG. 8 below), the media application may decrease the determined attentiveness level for each user because each of those users is not currently making eye contact with the display device featuring the media asset.

Figure 3:
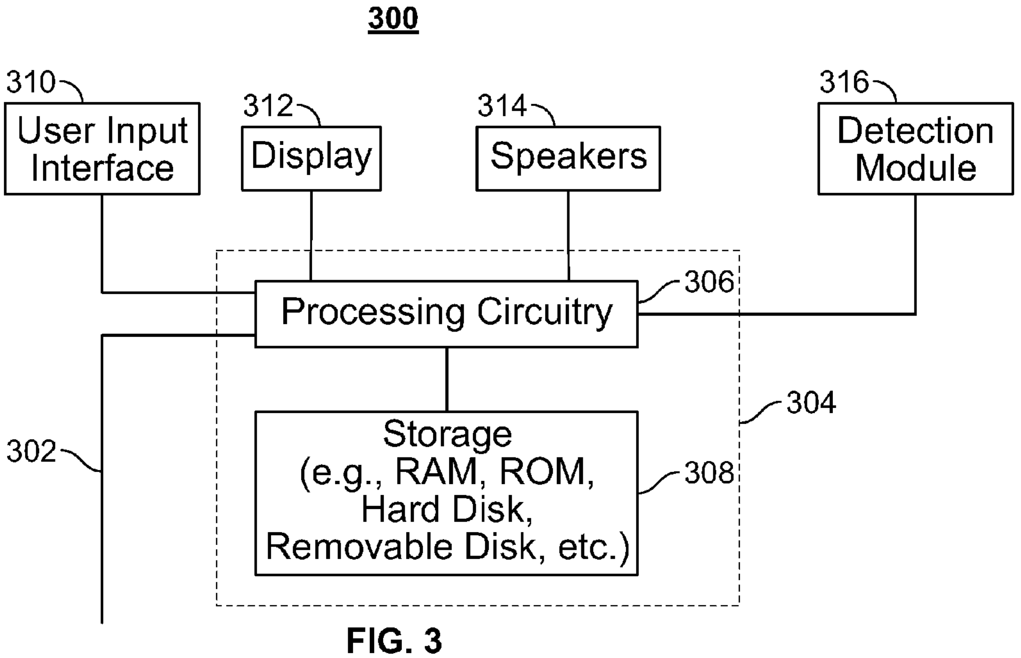
FIG. 3 is a block diagram of an illustrative user equipment device in accordance with some embodiments of the disclosure.

FIG. 3 is a block diagram of an illustrative user equipment device in accordance with some embodiments of the disclosure. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate the media guidance displays. In some implementations, any action performed by control circuitry 304 may be based on instructions received from the media application.

In client-server-based embodiments, control circuitry 304 may include communications circuitry suitable for communicating with a media application server or other networks or servers. The instructions for carrying out the above-mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and media application data, described above. Nonvolatile memory may also be used (e.g., to launch a boot-up routine and other instructions). Cloud-based storage, described in relation to FIG. 4, may be used to supplement storage 308 or instead of storage 308. Storage 308 may include a queue or stack used to store messages for which presentation has been delayed until an attentiveness level of one or more users is determined to exceed a threshold value.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive advertisement data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, etc.). In some embodiments, detection module 316 may include components that are specialized to generate particular information.

For example, as discussed below in relation to FIG. 5, detection module 316 may include an eye contact detection component, which determines or receives a location upon which one or both of a user's eyes are focused. The location upon which a user's eyes are focused is referred to herein as the user's "gaze point." In some embodiments, the eye contact detection component may monitor one or both eyes of a user of user equipment 300 to identify a gaze point on display 312 for the user. The eye contact detection component may additionally or alternatively determine whether one or both eyes of the user are focused on display 312 (e.g., indicating that a user is viewing display 312) or focused on a location that is not on display 312 (e.g., indicating that a user is not viewing display 312). In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, may be a separate device or system in communication with user equipment device 300.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server-based application. Data for use by a thick or thin client implemented on user equipment device 300 is retrieved on-demand by issuing requests to a server remote to the user equipment device 300. In one example of a client-server-based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

Figure 4:
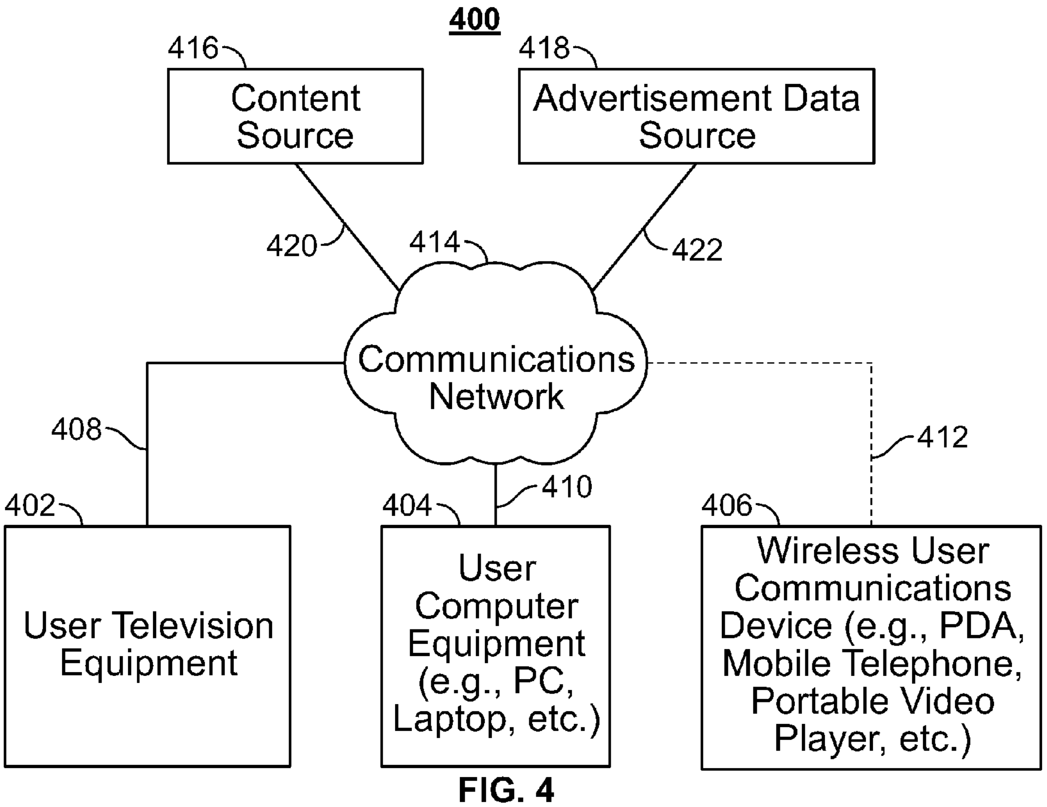
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as stand-alone devices or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled, allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that, in the exemplary embodiment shown in FIG. 4, it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and advertisement data source 418 coupled to communications network 414 via communication paths 420 and 422, respectively. Paths 420 and 422 may include any of the communication paths described above in connection with paths 408, 410, and 412. Communications with the content source 416 and advertisement data source 418 may be exchanged over one or more communications paths, but are shown as a single path in FIG. 4 to avoid overcomplicating the drawing. In addition, there may be more than one of each of content source 416 and advertisement data source 418, but only one of each is shown in FIG. 4 to avoid overcomplicating the drawing. (The different types of each of these sources are discussed below.) If desired, content source 416 and advertisement data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Advertisement data source 418 may provide advertisement data, such as the advertisement rules associated with an advertisement. Data necessary for the functioning of the media application may be provided to the user equipment devices using any suitable approach. In some embodiments, the media application may be a stand-alone interactive television program guide that receives program guide data via a data feed (e.g., a continuous feed or trickle feed). Program schedule data and other advertisement data may be provided to the user equipment on a television channel sideband, using an in-band digital signal, using an out-of-band digital signal, or by any other suitable data transmission technique. Program schedule data and other advertisement data may be provided to user equipment on multiple analog or digital television channels.

In some embodiments, advertisement data from advertisement data source 418 may be provided to users' equipment using a client-server approach. For example, a user equipment device may pull advertisement data from a server, or a server may push advertisement data to a user equipment device. In some embodiments, a media application client residing on the user's equipment may initiate sessions with source 418 to obtain advertisement data when needed, e.g., when the advertisement data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Advertisement data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., advertisement data source 418) running on control circuitry of the remote server. When executed by control circuitry of the remote server (such as advertisement data source 418), the media application may instruct the control circuitry to generate the media application displays and transmit the generated displays to the user equipment devices. The server application may instruct the control circuitry of the advertisement data source 418 to transmit data for storage on the user equipment. The client application may instruct control circuitry of the receiving user equipment to generate the media application displays.

Content and/or advertisement data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide advertisement data described above. In addition to content and/or advertisement data, providers of OTT content can distribute media applications (e.g., web-based applications or cloud-based applications), or the content can be displayed by media applications stored on the user equipment device.

Media guidance system 400 is intended to illustrate a number of approaches, or network configurations, by which user equipment devices and sources of content and advertisement data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media application implemented on a remote device. For example, users may access an online media application on a website via personal computers at their offices, or mobile devices such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud-computing environment to access cloud services. In a cloud-computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more advertisement data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud-computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

The media application may incorporate, or have access to, one or more content capture devices or applications, such as camcorders, digital cameras with video mode, audio recorders, mobile phones, and handheld computing devices, to generate data describing the attentiveness level of a user. The user can upload data describing the attentiveness level of a user to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the data describing the attentiveness level of a user uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
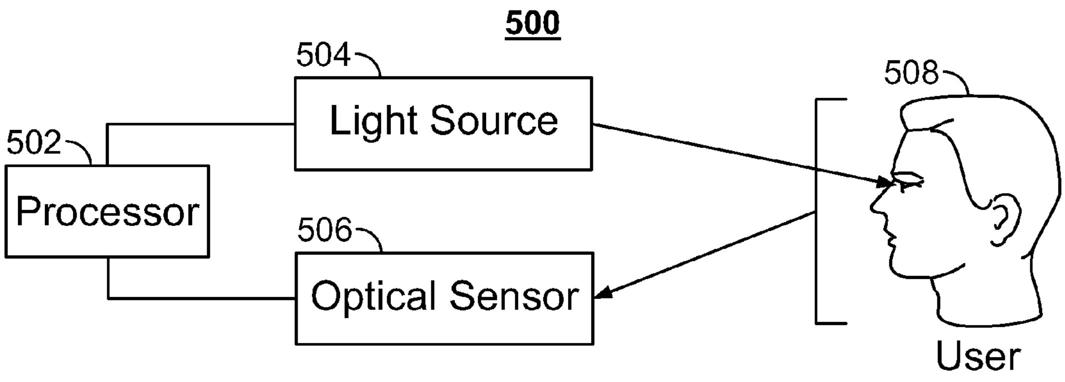
FIG. 5 is an illustrative example of one component of a detection module, which may be accessed by a media application in accordance with some embodiments of the disclosure.

FIG. 5 is an illustrative example of one component of a detection module, which may be accessed by a media application in accordance with some embodiments of the disclosure. FIG. 5 shows eye contact detection component 500, which may be used to identify an attentiveness level criteria or criterion (e.g., the gaze point of a user of user equipment 300), in order to determine the attentiveness level of the user. Attentiveness level criteria may include any one or combination of user eye contact with a user device, a gaze point of a user, whether a user is engaged in a conversation with another user, whether a user is interacting with another device (e.g., a second screen device), whether the user is listening to the user device, and/or whether the user is within a perceivable range of a user device. A first device for measuring an attentiveness level criterion may include eye contact detection component 500 which includes processor 502, light source 504, and optical sensor 506. Light source 504 transmits light that reaches at least one eye of a user, and optical sensor 506 is directed at the user to sense reflected light. Optical sensor 506 transmits collected data to processor 502, and based on the data received from optical sensor 506, processor 502 determines a user's gaze point.

In some embodiments, eye contact detection component 500 is configured for determining a gaze point of a single user. In other embodiments, eye contact detection component 500 may determine gaze points for a plurality of users (e.g., user 102, user 104, user 106, user 108, and user 110 (FIG. 1)). Eye contact detection component 500 may identify multiple users of user equipment device 300.

Processor 502 may be integrated with one or more light sources 504 and one or more optical sensors 506 in a single device. Additionally or alternatively, one or more light sources 504 and one or more optical sensors 506 may be housed separately from processor 502 and in wireless or wired communication with processor 502. One or more of processors 502, light sources 504, and optical sensors 506 may be integrated into user equipment device 300.

Processor 502 may be similar to processing circuitry 306 described above. In some embodiments, processor 502 may be processing circuitry 306, with processing circuitry 306 in communication with light source 504 and optical sensor 506. In other embodiments, processor 502 may be separate from but optionally in communication with processing circuitry 306.

Light source 504 transmits light to one or both eyes of one or more users. Light source 504 may emit, for example, infrared (IR) light, near infrared light, or visible light. The light emitted by light source 504 may be collimated or non-collimated. The light is reflected in a user's eye, forming, for example, the reflection from the outer surface of the cornea (i.e. a first Purkinje image), the reflection from the inner surface of the cornea (i.e. a second Purkinje image), the reflection from the outer (anterior) surface of the lens (i.e. a third Purkinje image), and/or the reflection from the inner (posterior) surface of the lens (i.e. a fourth Purkinje image).

Optical sensor 506 collects visual information, such as an image or series of images, of one or both of one or more users' eyes. Optical sensor 506 transmits the collected image(s) to processor 502, which processes the received image(s) to identify a glint (i.e. corneal reflection) and/or other reflection in one or both eyes of one or more users. Processor 502 may also determine the location of the center of the pupil of one or both eyes of one or more users. For each eye, processor 502 may compare the location of the pupil to the location of the glint and/or other reflection to estimate the gaze point. Processor 502 may also store or obtain information describing the location of one or more light sources 504 and/or the location of one or more optical sensors 506 relative to display 312. Using this information, processor 502 may determine a user's gaze point on display 312, or processor 502 may determine whether or not a user's gaze point is on display 312.

In some embodiments, eye contact detection component 500 performs best if the position of a user's head is fixed or relatively stable. In other embodiments, eye contact detection component 500 is configured to account for a user's head movement, which allows the user a more natural viewing experience than if the user's head were fixed in a particular position.

In some embodiments accounting for a user's head movement, eye contact detection component 500 includes two or more optical sensors 506. For example, two cameras may be arranged to form a stereo vision system for obtaining a 3D position of the user's eye or eyes; this allows processor 502 to compensate for head movement when determining the user's gaze point. The two or more optical sensors 506 may be part of a single unit or may be separate units. For example, user equipment device 300 may include two cameras used as optical sensors 506, or eye contact detection component 500 in communication with user equipment device 300 may include two optical sensors 506. In other embodiments, each of user equipment device 300 and eye contact detection component 500 may include an optical sensor, and processor 502 receives image data from the optical sensor of user equipment device 300 and the optical sensor of eye contact detection component 500. Processor 502 may receive data identifying the location of optical sensor 506 relative to display 312 and/or relative to each other and use this information when determining the gaze point.

In other embodiments accounting for a user's head movement, eye contact detection component 500 includes two or more light sources for generating multiple glints. For example, two light sources 504 may create glints at different locations of an eye; having information on the two glints allows the processor to determine a 3D position of the user's eye or eyes, allowing processor 502 to compensate for head movement. Processor 502 may also receive data identifying the location of light sources 504 relative to display 312 and/or relative to each other and use this information when determining the gaze point.

In some embodiments, other types of eye contact detection components that do not utilize a light source may be used. For example, optical sensor 506 and processor 502 may track other features of a user's eye, such as the retinal blood vessels or other features inside or on the surface of the user's eye, and follow these features as the eye rotates. Any other equipment or method for determining one or more users' gaze point(s) not discussed above may be used in addition to or instead of the above-described embodiments of eye contact detection component 500.

It should be noted that eye contact detection component 500 is but one type of component that may be incorporated into or accessible by detection module 316 (FIG. 3) or the media application for measuring an attentiveness level of a user or users. Other types of components, which may generate other types of data indicating an attentiveness level of a user or providing attentiveness level criteria or criterion (e.g., video, audio, textual, etc.) are fully within the bounds of this disclosure.

Figure 6:
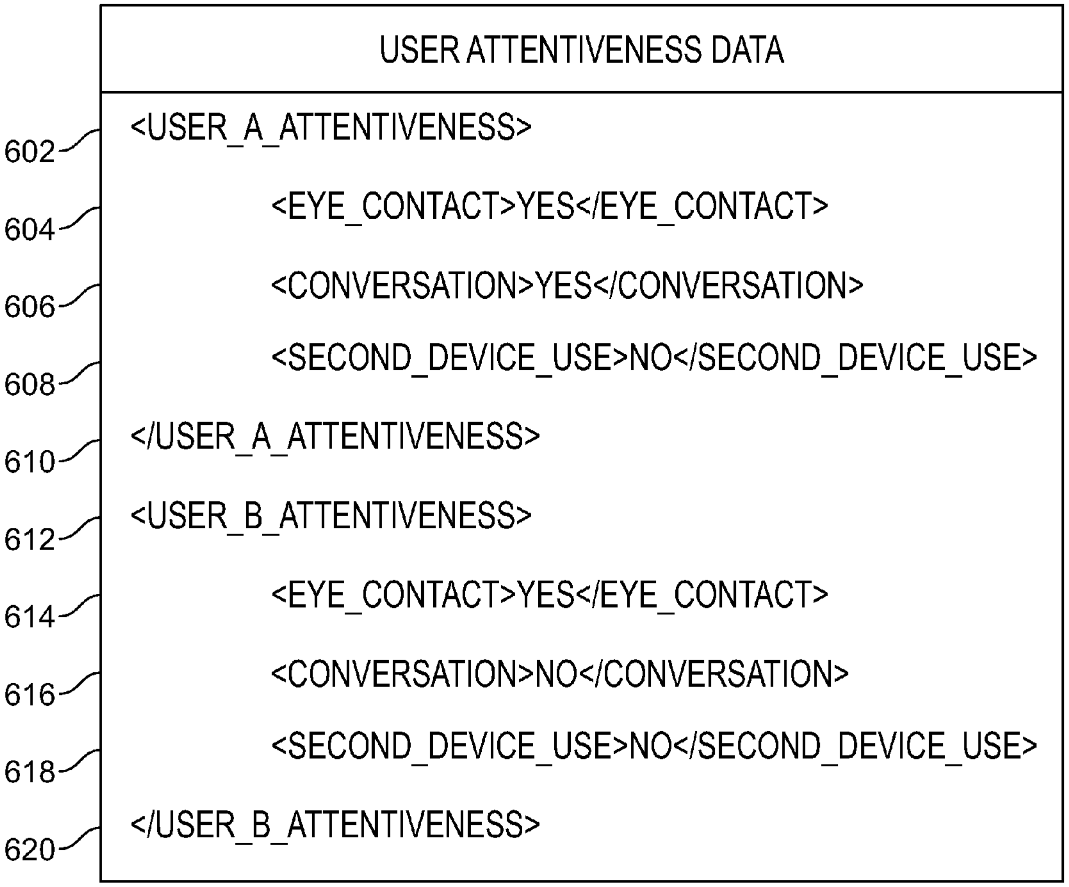
FIG. 6 is an illustrative example of a data structure indicating an attentiveness level of a user in accordance with some embodiments of the disclosure.

FIG. 6 is an illustrative example of a data structure that may be used to transmit data generated by the media application that is associated with an attentiveness level of a user in accordance with some embodiments of the disclosure. For example, data structure 600 may represent data generated by one or more components of detection module 316 (FIG. 3) such as eye contact detection component 500 (FIG. 5). In some embodiments, the media application may process data structure 600 to determine whether or not to present a textual-based social network communication in audible form as discussed below in relation to FIG. 7. For example, data structure 600 may be processed by control circuitry 304 (FIG. 3) as instructed by a media application implemented on user equipment 402, 404, and/or 406 (FIG. 4), content source 416 (FIG. 4), and/or any device accessible by communications network 414 (FIG. 4).

Data structure 600 includes multiple fields, which, in some embodiments, may include one or more lines of code for describing data and issuing instructions. For example, fields 602 through 620 indicate to the media application that data structure 600 relates to a media asset. It should be noted that the data (e.g., represented by the various fields) in data structure 600 is not limiting, and in some embodiments, the data as described in data structure 600 may be replaced or supplemented by other data as discussed in the disclosure.

Fields 602 through 610 relate to data describing the attentiveness level of a first user (e.g., user 102 (FIG. 1)) as generated by the media application, for example, via a detection module (e.g., detection module 316 (FIG. 3)) within a viewing area (e.g., viewing area 100 (FIG. 1)) associated with a display device (e.g., display device 112 (FIG. 1)). In some implementations, each of fields 602-610 may correspond to a different attentiveness level criteria or criterion. For example, field 604 indicates to the media application that the first user (e.g., user 102 (FIG. 1)) is making eye contact with the display device (e.g., display device 112 (FIG. 1)) displaying a media asset. Field 606 indicates to the media application that the first user is currently engaged in a conversation with another user (e.g., user 106 (FIG. 1)). Field 608 indicates to the media application that the first user is not using a second device (e.g., a smartphone or tablet computer).

Fields 612 through 620 relate to data describing the attentiveness level of a second user (e.g., user 104 (FIG. 1)) generated by the media application, for example, via a detection module (e.g., detection module 316 (FIG. 3)) within a viewing area (e.g., viewing area 100 (FIG. 1)). For example, field 614 indicates to the media application that the second user is making eye contact with the display device (e.g., display device 112 (FIG. 1)) displaying a media asset. Field 606 indicates to the media application that the second user is not currently engaged in a conversation with another user. Field 618 indicates to the media application that the second user is not currently using a second device. Field 618 may be populated by the media application based on information received from the second device. Alternatively or in addition, field 618 may be populated by the media application automatically based on visual cues associated with the second device (e.g., whether a user's face and/or body) is lit more brightly than another object in viewing area 100 due to the second device's screen.

Figure 7:
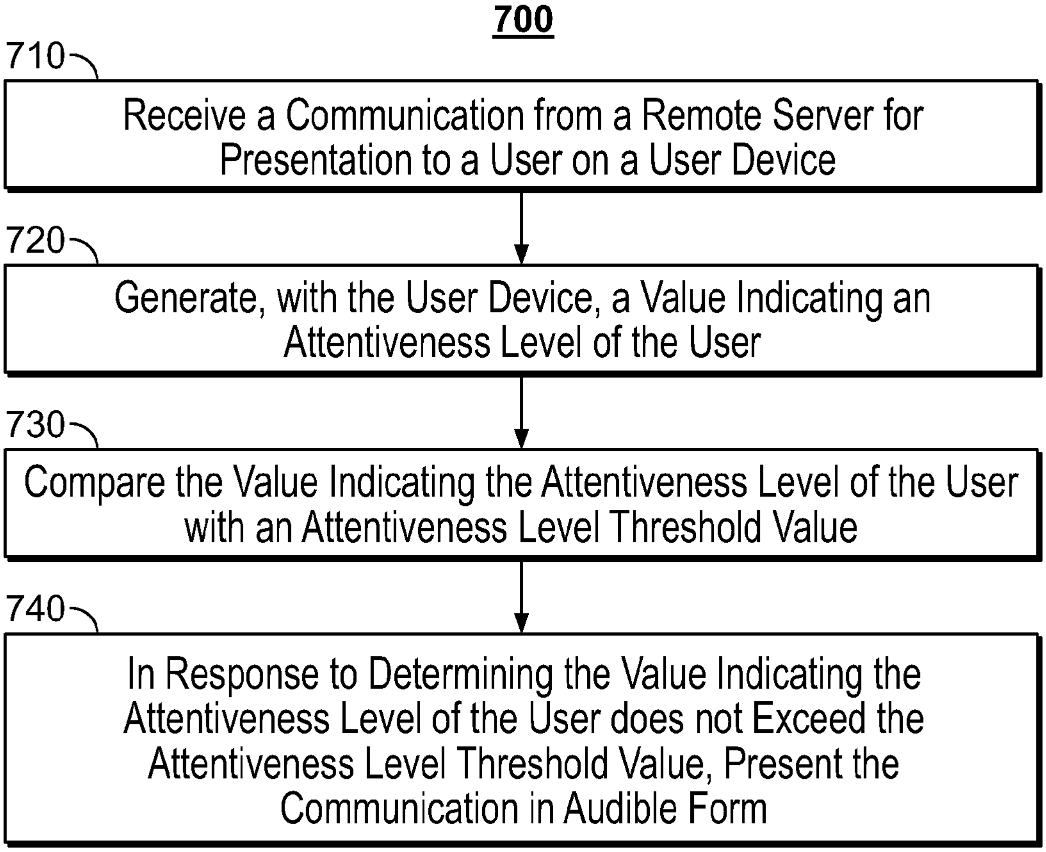
FIG. 7 is a flow diagram of an illustrative process for presenting a communication in audible form when the attentiveness level of the user does not exceed a threshold in accordance with some embodiments of the disclosure.

The media application may use the information in data structure 600 to compute an attentiveness level associated with each user (e.g., as described in relation to FIG. 7). For example, the media application may increase the attentiveness level of the first user and second user upon determining (e.g., based on field 604 and field 608) that the first user is making eye contact with the display device (e.g., display device 112 (FIG. 1)) and not using a second device. The media application may also decrease the attentiveness level of the first user upon determining (e.g., based on field 606) that the user is currently engaged in a conversation with another user. Furthermore, the media application may determine that the attentiveness level of the second user is higher than the attentiveness level of the first user because the second user (e.g., as indicated by field 616) is not currently engaged in a conversation with another user.

In some embodiments, in response to determining users are engaged in a conversation, the media application may determine a context for the conversation. Specifically, the media application may determine whether the conversation pertains to the content being presented to the users engaged in the conversation or not. The media application may process the conversation using a speech-to-text technique and determine whether any words in the speech correspond to content presented when the speech was detected. For example, the content that is presented may be associated with a list of words expected to be received as verbal input. The media application may cross-reference the words in the detected speech with the list of words and when a match exists, the media application may determine that the conversation pertains to the content being presented. Otherwise, when no match exists, the media application may determine that the conversation does not pertain to the content being presented.

In response to determining that the conversation pertains to the content being presented, the media application may determine whether the users who were engaged in the conversation are associated with a level of attentiveness that exceeds a given threshold (absent the conversation). When the users who were engaged in the conversation are also associated with a level of attentiveness that exceeds a given threshold, the media application may determine that the users have a heightened level of interest in the particular content being presented. For example, the media application may re-compute the attentiveness level of each user involved in the conversation without reducing the attentiveness level due to the detection of the conversation. The media application may then compare the re-computed attentiveness levels to a threshold to determine whether the users engaged in the conversation about content being presented are also attentive to the content being presented. In some implementations, the media application may determine whether the users who are engaged in the conversation were gazing towards the display on which the content was presented when the conversation took place.

In some implementations, when users are engaged in a conversation about content being presented and have an attentiveness level that exceeds a threshold, the media application may mark or identify the content being presented for future use. For example, the media application may add the show having the content being presented to a list of favorite shows. A user may then request a display of the list of favorite shows that have content that users were engaged with while having a conversation. In some implementations, the media application may generate a segment of the portion of the content during which the users were engaged in conversation and present the segment to one or more users at a later time (or upon receiving a request for the segment). In some implementations, the media application may retrieve one or more attributes (e.g., category or genre) associated with the portion of the content during which the users were engaged in conversation and generate an advertisement or recommendation of other content having one or more similar attributes. In some implementations, the media application may uniquely identify a media asset listing (or visually distinguish a media asset listing) associated with the content during which the users were engaged in conversation among other media asset listings associated with different media assets in a display.

FIG. 7 is a flow diagram of an illustrative process for presenting a communication in audible form when the attentiveness level of the user does not meet or exceed a threshold in accordance with some embodiments of the disclosure. Process 700 may be used to determine whether or not to present a text-based social network communication in audible form based on the attentiveness level of one or more users. It should be noted that process 700 or any step thereof could be provided by any of the devices shown in FIGS. 3-4. For example, process 700 may be executed by control circuitry 304 (FIG. 3) as instructed by the media application.

At step 710, a communication (e.g., a social network communication) is received (e.g., by the media application) for presentation to a first user on a user device (e.g., equipment 300). For example, control circuitry 304 may receive a communication from a remote server (e.g., a status update, private message from a second user to the first user, SMS message, MMS message, and/or posting on a social network). The received message may require immediate display to the user on user equipment device 300. The communication may be received while a media asset is being presented on the user device. In some implementations, the communication may relate to the content or media asset being presented on the user device as the user who generated the communication may be accessing the same media asset on different user equipment. In some implementations, the communication may be received in textual form. The textual-based communication may be transmitted to the remote server by a second user and the remote server then transmits the textual-based communication to the user equipment device associated with the first user responsive to determining that the second user is on a list of users associated with the first user. The remote server may be associated with a social network on which the list of users may be stored.

For example, a first user may be accessing a football game on first user equipment and a second user may be accessing the same game on second user equipment. The first and second users may be friends or associated with each other on the social network. While accessing the game, the second user may post a comment (e.g., a social network communication) about the game on the social network. The remote server associated with the social network may identify the relationship between the first and second users. In response to determining that the first and second users are friends on the social network, the remote server may transmit the comment generated by the second user to the first user. The comment may include text only, audio and text, video, or any other media. In some implementations, the remote server may associate a priority level with the communication. The priority level may indicate that the sender of the communication was identified as having a higher priority than other users on the list of users associated with the first user (e.g., because the sender is a family member) and/or that the contents of the communication are urgent (e.g., because they relate to an emergency or relate to a fantasy sporting event associated with the first user).

At step 720, the media application generates a value indicating an attentiveness level of the first user relative to user equipment device 300 (e.g., the equipment device on which the received message is to be presented). For example, the media application may use a detection module (e.g., detection module 316 (FIG. 3)), which may be incorporated into or accessible by one or more content capture devices. Data captured by the content capture devices may be processed via a content recognition module or algorithm to generate data or a value (e.g., regarding whether or not the user is making eye contact with the display device or regarding an attentiveness level criteria or criterion) describing the attentiveness of a user. In some embodiments, the data describing the attentiveness of a user may be recorded in a data structure (e.g., data structure 600 (FIG. 6)), which may be transmitted from the detection module to the media application or made available for retrieval by the media application. The process for generating the value indicating an attentiveness level of one or more users is discussed in more detail below in connection with FIG. 8.

Additionally or alternatively, the media application may cross-reference the generated raw attentiveness level data in a database indicative of an attentiveness level of a user in order to determine an attentiveness level to associate with the user. For example, the media application may generate a data structure (e.g., data structure 600 (FIG. 6)) describing the attentiveness of a user. The data structure may then be transmitted to a remote server (e.g., advertisement data source 418 (FIG. 4)) to be cross-referenced in a database. Based on the cross-reference, the remote server may transmit an attentiveness level to associate with the first user to the media application.

At step 730, the media application compares the value indicating the attentiveness level of the first user with a threshold attentiveness level value. The media application may retrieve from storage 308 a threshold value for attentiveness level. The computed attentiveness level value may represent a numerical amount or score and may be compared with the retrieved threshold value. The media application (e.g., via control circuitry 304 (FIG. 4)) may then determine whether or not the attentiveness level value of the user (e.g., user 102 (FIG. 1)) equals or exceeds the threshold attentiveness level value. In some embodiments, the threshold attentiveness level may dynamically change based on time of day. For example, in the morning the threshold may be set to a lower value than in the evening. This is because most users are less attentive in the morning than the evening. Accordingly, the media application may consider a user performing a given activity or gazing at a second screen device to be attentive in the morning but not in the evening.

If the media application determines that the attentiveness level exceeds the threshold attentiveness level, the media application (e.g., via control circuitry 304 (FIG. 3)) may transmit an instruction to present the social network communication on the display device (e.g., display device 112 (FIG. 1)). At step 740, in response to determining that the value indicating the attentiveness level of the first user does not exceed the attentiveness level threshold value, the media application (e.g., via control circuitry 304 (FIG. 3)) may transmit an instruction to processing circuitry 306 to convert the content of the received social network communication to audible form. For example, when the social network communication includes text, the media application may instruct processing circuitry 306 to apply a text-to-speech technique to convert the text of the social network communication to audible form. The media application may then instruct processing circuitry 306 to present audio of the converted social network communication using speakers 314. Specifically, when the media application determines the attentiveness level of the user does not exceed the threshold value, the media application may convert a received social network communication from one form (e.g., textual form) the user is unlikely to perceive into a different form (e.g., audible form) that the user is more likely to perceive.

In some implementations, the media application may apply a voice of the user who sent the communication to the audio of the converted communication to cause the audio of the converted communication to sound like the user who sent the communication. In some embodiments, the media application may cause the audio of the converted communication to sound like the user who sent the communication for only a subset of users in the list of users associated with a given user. When a social network communication is received from a user who is on the list of users associated with the user but is not in the subset then the media application may present the social network communication in audible form using a default voice (e.g., a computer voice). Alternatively, when a social network communication is received from a user who is on the list of users associated with the user but is not in the subset then the media application may present the social network communication in visual form only despite the recipient being associated with an attentiveness level that does not exceed a threshold value. Alternatively, when a social network communication is received from a user who is on the list of users associated with the user and is in the subset then the media application may present the social network communication in audible form using a voice associated with the user who sent the communication or a voice unique to the specified set of users. For example, social network communications received from family members may be presented using a first voice signature while social network communications received from friends may be presented using a second voice signature.

In some implementations, the media application may instruct processing circuitry 306 to generate an additional unique audible signal before or after presenting the communication in audible form based on a priority level associated with the communication. The unique audible signal may be unique to the sender of the communication and may identify the sender of the communication to the first user. Alternatively or in addition, the unique audible signal may uniquely identify contents of the message as being urgent.

In some implementations, the social network communication may include video and/or audio components. In such circumstances, the media application may instruct processing circuitry 306 to combine the audio components of the social network communication with the audio components of the textual information converted to audible form in the social network communication. In some embodiments, the media application may present visual components of the social network communication together with the audio of the converted social network communication. Accordingly, a message present in the social network communication may be available to the first user in visual form and in audible form to ensure the user is exposed to the social network communication.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
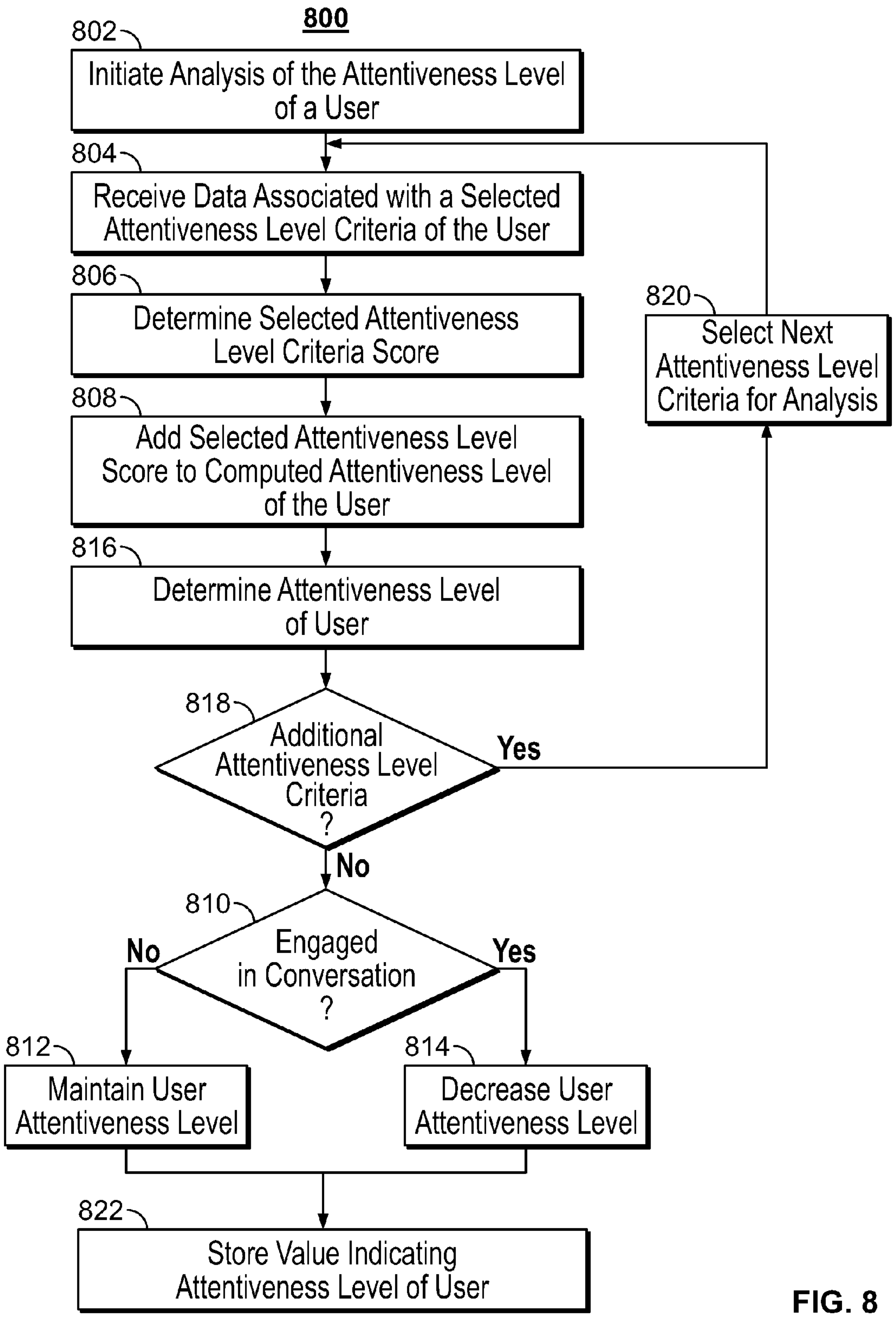
FIG. 8 is a flow diagram of an illustrative process for computing a value indicating an attentiveness level of one or more users in accordance with some embodiments of the disclosure.

FIG. 8 is a flow diagram of an illustrative process for computing a value indicating an attentiveness level of one or more users in accordance with some embodiments of the disclosure. Process 800 may be used to determine whether or not to delay presentation of a message based on the attentiveness level of one or more users. It should be noted that process 800 or any step thereof could be provided by any of the devices shown in FIGS. 3-4. For example, process 800 may be executed by control circuitry 304 (FIG. 3) as instructed by the media application.

At step 802, the media application initiates an analysis of the attentiveness of a user. In some embodiments, the media application may issue an instruction (e.g., via control circuitry 304 (FIG. 3)) to a detection module (e.g., detection module 316 (FIG. 316)) to generate data describing the attentiveness level of one or more users (e.g., user 102 (FIG. 1)) in a viewing area (e.g., viewing area 100 (FIG. 1)) of a user equipment device 300 on which a social network communication is to be presented.

For example, in response to receiving an instruction from the media application, a detection module (e.g., detection module 316 (FIG. 3)) may instruct one or more of its components to generate one or more types of data. For example, in response to an instruction from the media application (e.g. via control circuitry 304 (FIG. 3)) or the detection module, an eye contact detection component (e.g., eye contact detection component 500 (FIG. 5)) may generate data describing whether or not a user is making eye contact with the display device (e.g., display device 112 (FIG. 1)) on which a message is to be presented.

At step 804, the media application receives data associated with a selected attentiveness level criterion. For example, in some embodiments, data associated with a selected attentiveness level criterion of a user may be recorded/transmitted in a data structure (e.g., data structure 600 (FIG. 6)). In some embodiments, the data structure may be generated by the detection module (e.g., detection module 316 (FIG. 3)) from transmission to the media application. For example, the selected attentiveness level criterion may be an indication of whether the user is gazing towards the display on which the message is to be presented. In some embodiments, the attentiveness level criterion may include an indication of whether the user for which attentiveness is being measured is associated with a visual or audible impairment.

At step 806, the media application (e.g., via control circuitry 304 (FIG. 3)) determines a score for the selected attentiveness level based on the data associated with the selected attentiveness level criterion. For example, when the selected attentiveness level criterion is an indication of whether the user is gazing towards the display on which the message is to be presented, the media application may assign a value to the selected criterion equal to one point if the user is currently making eye contact and negative one point if the user is not currently making eye contact with the display. In some implementations, the attentiveness level may be increased or decreased based on a visual or audible impairment of the user. Namely, the attentiveness level may be decreased when a user has a visual impairment so as to cause any social network communication that is received to be presented in audible form.

At step 808, the media application adds the computed score of the selected attentiveness level criterion to the overall computed attentiveness level of the user. For example, in some embodiments, the media application may receive several types of data associated with the attentiveness of a user (e.g., from one or more components of detection module 316 (FIG. 3)) and individual scores/values may be assigned to each type of data. The media application may then add the scores/values of the different types of data to generate the overall attentiveness level associated with the user. In some implementations, an overall score that is very high may indicate that more than one or some other predetermined number of attentiveness level criteria has been met or indicate the user is attentive to the user device. In some implementations, an overall score that is very low may indicate that a fewer number of attentiveness level criteria has been met or indicate the user is attentive to the user device.

At step 816, the media application determines the attentiveness level of the user. For example, as discussed above, the media application may receive multiple types of data describing the attentiveness of the user. The media application (e.g., via control circuitry 304 (FIG. 3)) may process (e.g., via assigning a value and adding the values together) each type of data to determine an attentiveness level associated with the user. In some embodiments, the media application may consider a visual or audible impairment of the user to increase or decrease the attentiveness level of the user. The attentiveness level of the user may then be used to determine whether or not to convert a received social network communication to audible form from textual form as discussed in relation to FIGS. 7, 9 and 10.

At step 818, the media application determines whether or not there are additional attentiveness level criteria to process and add to the overall attentiveness level score. If so, the media application proceeds to step 820, to select a different attentiveness level criterion to process and add to the overall attentiveness level score, and returns to step 804. If the media application determines there are no additional attentiveness level criteria to process, the media application proceeds to step 810.

At step 810, the media application determines whether or not the user is currently engaged in a conversation. For example, the media application may receive data (e.g., generated using speech recognition techniques discussed above), which indicate that the user is speaking to another user. In some embodiments, the data may be transmitted in a data structure (e.g., data structure 600 (FIG. 6)), which indicates (e.g., field 606 (FIG. 6)) whether or not the user is engaged in a conversation. Data related to whether or not the user is currently engaged in conversation may then be used by the media application to determine an attentiveness level of the user.

If the media application determines (e.g., via processing data structure 600 (FIG. 6)) that the user is currently engaged in a conversation, the media application, at step 814, decreases (e.g., by an increment of value used to compute the attentiveness level of the user) the attentiveness level of the user because speaking to another user may distract the user from seeing the social network communication displayed on the display device (e.g., display device 112 (FIG. 1)). If the media application determines (e.g., via processing data structure 600 (FIG. 6)) that the user is not currently engaged in a conversation, the media application, at step 812, maintains the overall computed attentiveness level of the user because the user is less likely to be distracted from seeing the social network communication displayed on the display device (e.g., display device 112 (FIG. 1)).

At step 822, the overall attentiveness level computed for the one or more users is stored in storage 308. The stored value may be compared at step 730 (FIG. 7) with the threshold value for the attentiveness level to determine whether or not to convert a received social network communication from one form to another.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

Figure 9:
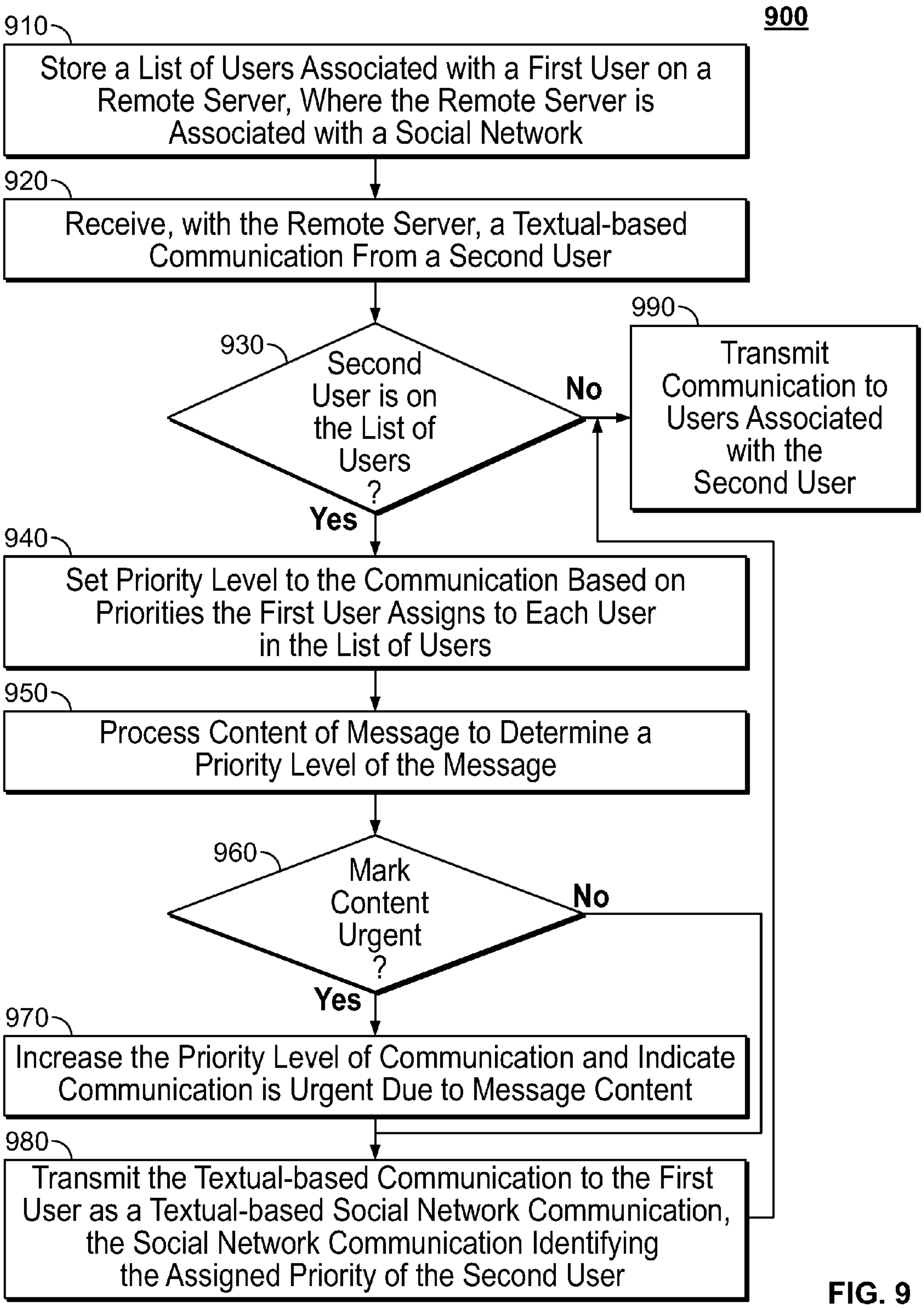
FIG. 9 is a flow diagram of an illustrative process for transmitting a social network communication in accordance with some embodiments of the disclosure.

FIG. 9 is a flow diagram of an illustrative process for transmitting a social network communication in accordance with some embodiments of the disclosure. For example, in some embodiments, process 900 may be used in parts of process 700 (FIG. 7). It should be noted that process 900 or any step thereof could be provided by any of the devices shown in FIGS. 3-4. For example, process 900 may be executed by control circuitry 304 (FIG. 3) of a remote server.

At step 910, the media application may store a list of users associated with a first user on a remote server, wherein the remote server is associated with a social network. For example, the media application may receive a user input from the first user that identifies a one or more other users on the social network. The remote server may receive the user input and once the one or more other users confirm their friendship or relationship to the first user, the one or more other users are added to the list of users associated with the first user. In some implementations, the first user may associate a priority level with different groups of users in the list of users. For example, the first user may identify the list of users that are immediate family members as having a first priority level. The first user may identify the list of users that are colleagues as having a second priority level that is lower than the first priority level. The remote server may also receive input from the user specifying interests of the user, such as fantasy sporting event competitors, sporting event competitors the user likes, social or current events of interest to the user or any other information stored in a profile of the user.

At step 920, the remote server (as instructed by the media application) may receive a textual-based communication from a second user. For example, a user may access the remote server using a media application (e.g., by logging onto a website associated with the social network of the server). The remote server may receive a status update, posting, SMS, MMS, or private message to another user from the second user. The communication may include text only or a mix of text and other media content (e.g., a media asset).

At step 930, the remote server (as instructed by the media application) may determine whether the second user is on the list of users stored on the server associated with the first user. In response to determining that the second user is on the list of users, the process proceeds to step 940, otherwise the process proceeds to step 990. For example, the remote server may cross-reference the identity of the second user (e.g., name or username of the second user) with the list of users associated with the first user that is stored on the remote server.

At step 940, the remote server (as instructed by the media application) may set a priority level to the communication based on priorities the first user assigns to each user in the list of users. For example, the remote server may determine whether the second user is within a designated group within the list of users. If the user is within a designated group (e.g., immediate family members), the remote server may retrieve a priority level that is set for that group and assign it to the communication.

At step 950, the remote server (as instructed by the media application) may process content of the message in the communication to determine a priority level of the message. For example, the remote server may look for keywords in the communication that may be associated with a high level of urgency (e.g., fire, earthquake, "Oh My"). In some implementations, the remote server may cross-reference a database of keywords that are associated with a high level of urgency to determine whether any words or phrases in the communication are urgent. In some implementations, the keywords that are associated with a high level of urgency may be specific to the first user and may be determined based on a user profile of the first user. For example, the keywords may include names of sporting event competitors, fantasy sporting event competitors, actors, actresses, directors or any other words that have a higher than normal level of interest to the first user. In response to determining that words in the communication are associated with a high level of urgency, the remote server may mark the communication as urgent in step 960 and proceed to step 970. Otherwise, the remote server may proceed to step 980.

At step 970, the remote server (as instructed by the media application) may increase the priority level of the communication and indicate the communication is urgent due to message content in the communication. For example, the remote server may update a data structure associated with the communication to increase the priority level and may store a flag in the data structure indicating the communication is urgent.

At step 980, the remote server (as instructed by the media application) may transmit the textual-based communication to the first user as a textual-based social network communication. The transmitted communication may include the data structure identifying the assigned priority of the second user, the communication and/or level of urgency. For example, the remote server may send the communication to a mobile device or user equipment associated with the first user. Alternatively or in addition, the remote server may store the communication in a profile on the social network associated with the first user. When the user accesses the social network, the remote server may retrieve the communication and present the communication to the user. In some embodiments, the communication may include a voice signature of the second user (e.g., the user who sent the communication).

At step 990, the remote server (as instructed by the media application) may transmit the communication to users associated with the second user. For example, the remote server may retrieve a list of users associated with the second user on the social network. The remote server may then perform step 980 for each user in the list of users associated with the second user.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

Figure 10:
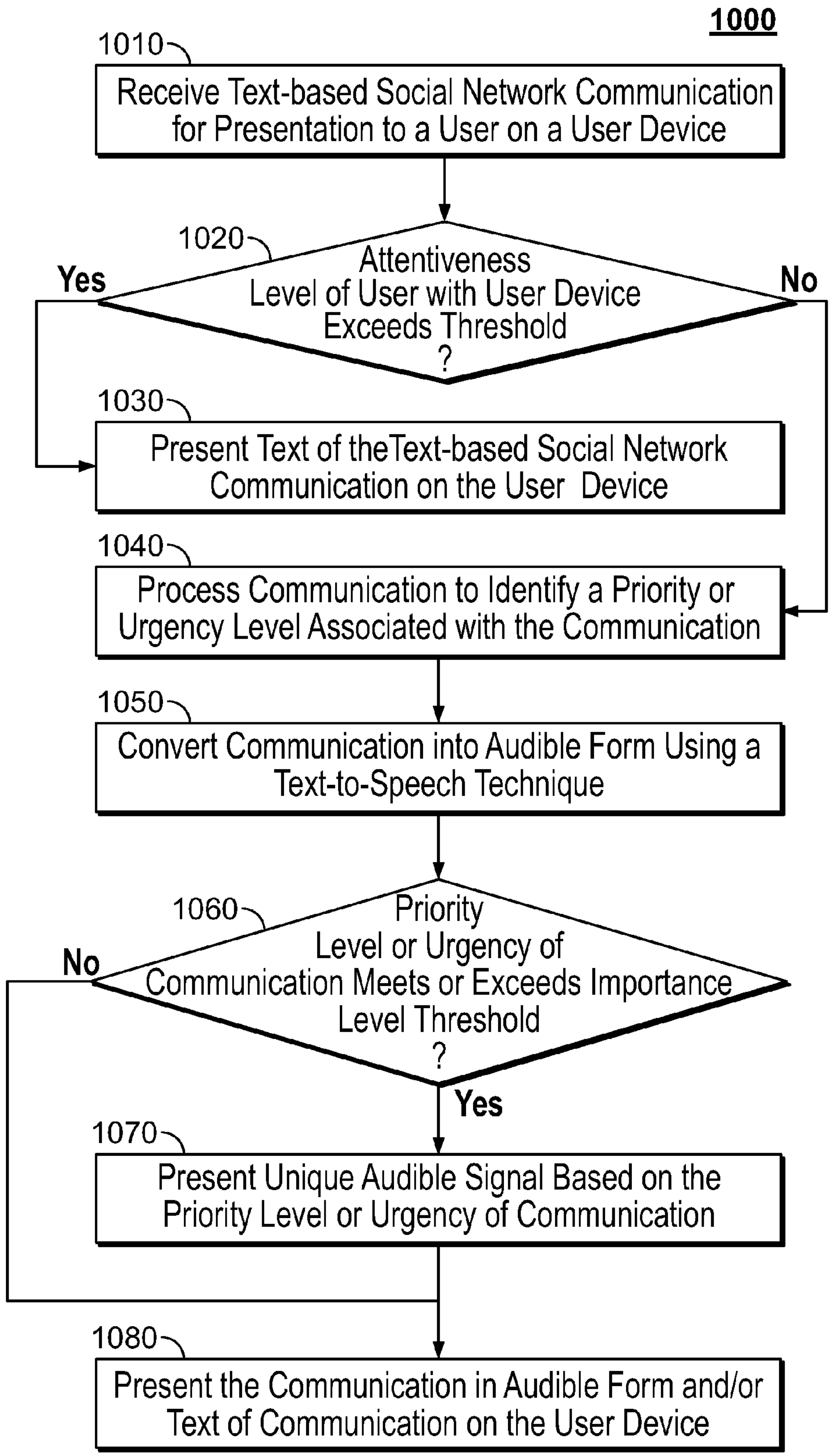
FIG. 10 is a flow diagram of an illustrative process for presenting a social network communication in audible form when the attentiveness level of the user does not exceed a threshold based on priorities in accordance with some embodiments of the disclosure.

FIG. 10 is a flow diagram of illustrative steps for determining whether or not to present a received communication in audible form in accordance with some embodiments of the present disclosure. For example, in some embodiments, process 1000 may be used in parts of processes 700-900 (FIGS. 7-9). It should be noted that process 1000 or any step thereof could be provided by any of the devices shown in FIGS. 3-4. For example, process 1000 may be executed by control circuitry 304 (FIG. 3) as instructed by the media application.

At step 1010, the media application may receive a textual-based social network communication for presentation on a user device. For example, control circuitry 304 may receive a communication from a remote source or server (e.g., a status update on a social network). The remote server may transmit the communication in accordance with process 900 (FIG. 9).

At step 920, the media application may determine whether an attentiveness level value of the user with the user device exceeds a threshold. For example, the media application may instruct control circuitry 304 to determine an attentiveness level of the user (e.g., using process 800) and to retrieve from storage 308 an attentiveness level threshold value. In some implementations, control circuitry 304 may compute the attentiveness level threshold value based on a current state of the user or a profile associated with the user. The media application may compare the determined attentiveness level with the retrieved or computed attentiveness level threshold value to determine whether the threshold is exceeded. In response to determining that the threshold is exceeded, the process proceeds to step 1030, otherwise the process proceeds to step 1040. Step 920 may be performed in the context of multiple users and their aggregated attentiveness levels. The determination of whether the attentiveness level exceeds the threshold value may be performed based on whether the aggregate attentiveness level of all the users in the range of the device exceeds the given threshold.

At step 1030, the media application may present text and/or video or other content of the received communication on a display of the user device. Specifically, the media application may present the received communication in the same form as it is received.

At step 1040, the media application may process the received communication to identify a priority level and/or urgency level associated with the communication. For example, the media application may process a data structure associated with the communication to determine whether a priority field in the data structure includes a level of importance (e.g., a level from 1-3 where 1 is least important) and/or or whether an urgency field is asserted. In some implementations, the media application may automatically assign a priority level to the received message based on a user profile and the type of communication that was received. For example, the user may have previously indicated or the media application may automatically determine based on monitored user interactions, that communications from a given user (e.g., a family member) on the list of users associated with the first user are associated with a highest priority and therefore should be identified as a higher priority level than communications associated with other users (e.g., colleagues) on the list. Similarly, the media application may determine based on the user profile that communications with certain messages or content (e.g., messages associated with a sporting event, fantasy sporting event competitor, news event, etc.) are associated with a higher importance level than other communications. The media application may automatically assign a priority level to the received communication based on the type of communication and the user profile.

Alternatively or additionally, the media application may process the contents of the message and perform text or content recognition to determine and assign a priority level of the communication. For example, the media application may perform text recognition on the received communication to determine whether certain words (stored in a database) associated with high importance level (e.g., "urgent," "emergency," and/or "important") appear in the received message. In response to determining the content of the message includes words associated with a high priority level, the media application may assign a high priority level to the communication. In some implementations, the media application may perform image recognition on the received communication to determine whether certain images associated with high priority level (e.g., pictures of friends or family members or important people identified by the user) appear in the received communication. In response to determining the content of the communication includes images associated with a high priority level, the media application may assign a high priority level to the communication.

At step 1050, the media application may convert the communication into audible form using a text-to-speech technique or process. For example, the media application may instruct control circuitry 304 to process text of the communication using a text-to-speech technique to generate an audible version of the communication. In some embodiments, the media application may retrieve the voice signature of the second user from the data structure received with the communication. The media application may apply the voice signature to cause the audible version of the communication to sound like or be in the voice of the second user. In some embodiments, the media application may use a default voice instead of the voice of the second user when the second user is not in an identified subset of users. Namely, if the second user is in a list of users associated with the user but is not in a subset of authorized users for whom voices are authorized to be used by the recipient, then the social network communication may be presented using a default voice. Alternatively, if the second user is in a list of users associated with the user but is not in a subset of authorized users for whom social network communications are authorized to be received by the recipient, then the media application may only present the social network communication in audible form even though the recipient is associated with an attentiveness level that does not exceed a threshold value.

At step 1060, the media application may determine whether the priority level or urgency of the communication meets or exceeds an importance level threshold. In response to determining that the priority level or urgency meets or exceeds the threshold, the process proceeds to step 1070, otherwise the process proceeds to step 1080. In some embodiments, the importance level threshold may be dynamically adjusted based on a behavior or behavioral cues associated with one or more viewers in viewing area 100. For example, in response to determining that a user in viewing area 100 turns off a mobile device, the media application may increase the importance level threshold. This is because the media application infers that the user who turned off the mobile device does not want to be disturbed.

At step 1070, the media application may present a unique audible signal based on the priority level or urgency of the communication. For example, in response to determining that the communication priority level is high because the communication was sent from a second user with high priority, the media application may retrieve a unique audible signal associated with the second user and present (e.g., sound) the retrieved signal. The audible signal may identify the second user to the first user when the first user hears the audible signal (i.e., when the audible signal is sounded). The audible signal may be unique to a group of users and may identify the group of users uniquely (e.g., a family) to the first user when the first user hears the audible signal. The audible signal may be unique to certain events that are urgent (e.g., breaking news or changes associated with a fantasy sporting event competitor associated with the first user). When the first user hears the audible signal associated with the certain events, the first user is able to identify the associated event.

At step 1080, the media application may present the communication in audible form and/or text or other visual components of the communication on the user device. For example, the media application may present the unique audible signal of step 1070 with the audible form of the communication on a shared audio device (e.g., speakers) and/or on one or more mobile devices associated with the users (e.g., including the first user) within range of the user device on which the visual components of the communication are displayed.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for generating an audible presentation of a communication received from a remote server, the method comprising:

generating a presentation, for a first user, of a media asset on a user equipment device;

receiving, at the user equipment device from the remote server, a textual-based communication, wherein the textual-based communication is transmitted to the remote server by a second user, and wherein the remote server is configured to:

identify a plurality of users that includes the first user that are associated with the second user; and transmit the textual-based communication to each user in the identified plurality of users including the first user;

computing an engagement level of the first user based on one or more current actions being performed by the first user; and responsive to determining that the engagement level of the first user does not exceed a threshold value, directing a presentation of the textual-based communication in audible form to the first user to ensure the first user is exposed to the communication, wherein the presentation of the textual-based communication in audible form is provided concurrently with the presentation of audio corresponding to the media asset on the user equipment device.

2. The method of claim 1, wherein the generating presentation of the textual-based communication in audible form is performed instead of generating a visual presentation of the communication.

3. The method of claim 1 further comprising processing text from the textual-based communication using a text-to-speech technique to convert the text into the audible form based on a voice of the second user, such that when sounded the audio of the communication is presented in the voice of the second user.

4. The method of claim 1, wherein the remote server is associated with a social network, wherein the textual-based communication is a communication on the social network, and wherein the plurality of users includes friends of the second user on the social network.

5. The method of claim 1 further comprising:

determining a priority level associated with the second user; and in response to determining the priority level exceeds a priority threshold assigned by the first user, generating an audible signal unique to the second user, the audible signal identifies the second user to the first user.

6. The method of claim 5, wherein the audible signal is sounded before the textual-based communication is presented in audible form.

7. The method of claim 1, wherein determining the engagement level comprises determining whether a gaze of the first user is directed at a display associated with the user equipment device for a threshold period of time.

8. The method of claim 1, wherein computing the engagement level comprises:

detecting a conversation between the first user and another user;

determining whether the conversation pertains to content of the media asset being presented;

in response to determining the conversation pertains to the content of the media asset being presented increasing the engagement level; and in response to determining the conversation does not pertain to the content of the media asset being presented decreasing the engagement level.

9. The method of claim 1, wherein the engagement level of the first user is a first engagement level, further comprising:

identifying a plurality of users including the first user within a range of the user equipment device;

determining an action currently being performed by a third of the plurality of users;

computing a second engagement level for the third user based on the determined action; and aggregating the computed first and second engagement level, wherein determining that the engagement level does not exceed a threshold value comprises determining whether the aggregated first and second engagement levels do not exceed the threshold.

10. A system for generating an audible presentation of a communication received from a remote server, the system comprising:

processing circuitry configured to:

generate a presentation, for a first user, of a media asset on a user equipment device;

receive, at the user equipment device from the remote server, a textual-based communication, wherein the textual-based communication is transmitted to the remote server by a second user, and wherein the remote server is configured to:

identify a plurality of users that includes the first user that are associated with the second user; and transmit the textual-based communication to each user in the identified plurality of users including the first user;

compute an engagement level of the first user based on one or more current actions being performed by the first user; and responsive to determining that the engagement level of the first user does not exceed a threshold value, direct a presentation of the textual-based communication in audible form to the first user to ensure the first user is exposed to the communication, wherein the presentation of the textual-based communication in audible form is provided concurrently with the presentation of audio corresponding to the media asset on the user equipment device.

11. The system of claim 10, wherein the processing circuitry is further configured to generate the presentation of the textual-based communication in audible form instead of generating a visual presentation of the communication.

12. The system of claim 10, wherein the processing circuitry is further configured to process text from the textual-based communication using a text-to-speech technique to convert the text into the audible form based on a voice of the second user, such that when sounded the audio of the communication is presented in the voice of the second user.

13. The system of claim 10, wherein the remote server is associated with a social network, wherein the textual-based communication is a communication on the social network, and wherein the plurality of users includes friends of the second user on the social network.

14. The system of claim 10, wherein the processing circuitry is further configured to:

determine a priority level associated with the second user; and in response to determining the priority level exceeds a priority threshold assigned by the first user, generate an audible signal unique to the second user, the audible signal identifies the second user to the first user.

15. The system of claim 14, wherein the audible signal is sounded before the textual-based communication is presented in audible form.

16. The system of claim 10, wherein the processing circuitry is further configured to determine whether a gaze of the first user is directed at a display associated with the user equipment device for a threshold period of time.

17. The system of claim 10, wherein the processing circuitry is further configured to:

detect a conversation between the first user and another user;

determine whether the conversation pertains to content of the media asset being presented;

in response to determining the conversation pertains to the content of the media asset being presented increase the engagement level; and in response to determining the conversation does not pertain to the content of the media asset being presented decrease the engagement level.

18. The system of claim 10, wherein the engagement level of the first user is a first engagement level, and wherein the processing circuitry is further configured to:

identify a plurality of users including the first user within a range of the user equipment device;

determine an action currently being performed by a third of the plurality of users;

compute a second engagement level for the third user based on the determined action; and aggregate the computed first and second engagement level, wherein determining that the engagement level does not exceed a threshold value comprises determining whether the aggregated first and second engagement levels do not exceed the threshold.

* * * * *